Aug. 8, 1950     O. S. OLSEN     2,518,056
PEDAL EXTENSION
Filed March 8, 1949
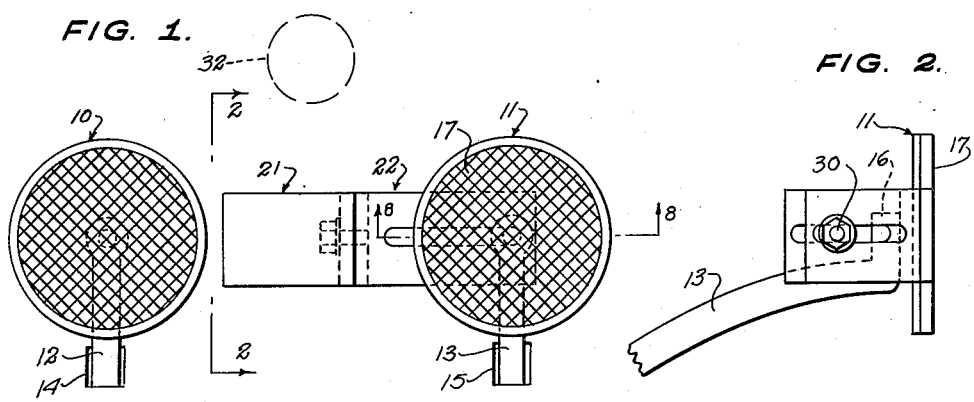
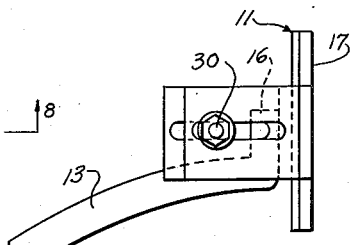
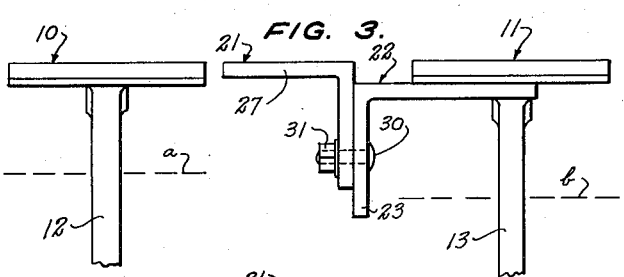
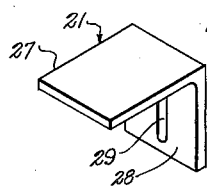
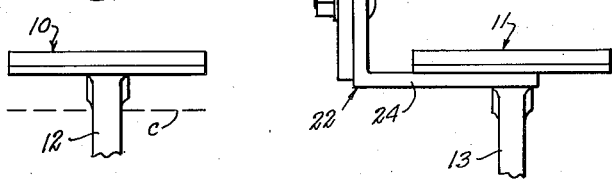
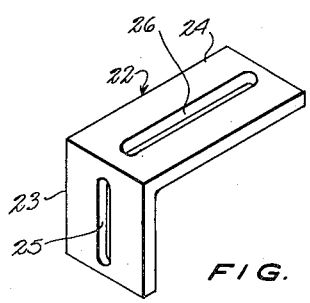
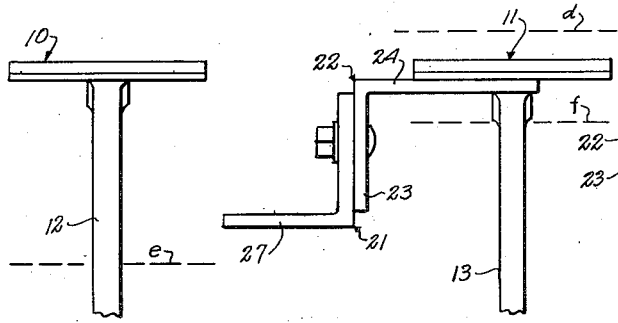
INVENTOR.
OTTO S. OLSEN,
BY
McMorrow, Berman + Davidson
ATTORNEYS.

Patented Aug. 8, 1950

2,518,056

UNITED STATES PATENT OFFICE 2,518,056

PEDAL EXTENSION

Otto S. Olsen, Alhambra, Calif.

Application March 8, 1949, Serial No. 80,190

2 Claims. (Cl. 74—562)

This invention relates to pedal extensions, and more particularly to an extension for one pedal of a pair of foot-operated brake and clutch pedals of an automotive vehicle to render both pedals simultaneously operable by one foot of the person driving the vehicle.

It is among the objects of the invention to provide a pedal extension which can be quickly and easily attached to one of the two brake and clutch operating pedals of an automotive vehicle to extend across the space between the two pedals to a location adjacent the other pedal, so that both pedals can be operated by one foot of the person driving the vehicle, which extension is fully adjustable to compensate for different distances between the pedals of different vehicles and for differences in the level of the pedals when in normal position and the different amounts of pedal movement required to engage the vehicle brakes, or disengage the vehicle clutch, which is simple and durable in construction, extremely economical to manufacture and neat and attractive in appearance, and which requires no important modification of the existing vehicle or pedal structure for its installation, and does not interfere in any way with vehicle components adjacent the foot pedals, or with the operation of the pedals.

Other objects and advantages will become apparent from a consideration of the following description and the appended claims in conjunction with the accompanying drawing, wherein:

Figure 1 is a somewhat diagrammatic view of a pair of vehicle brake and clutch operating pedals with an extension illustrative of the invention attached to the brake pedal and extending to a location adjacent the clutch pedal;

Figure 2 is an end elevation of the extension, and a side elevation of the brake pedal looking substantially from the line 2—2 of Figure 1;

Figure 3 is a diagrammatic side elevation of the two pedals and the extension with the extension adjusted for one operative condition of the two pedals;

Figure 4 is a view similar to Figure 3 with the extension adjusted for a different operating condition of the pedals;

Figure 5 is a view similar to Figures 3 and 4 with the extension adjusted for a still different operating condition of the pedals;

Figure 6 is a perspective view of one component of the extension;

Figure 7 is a perspective view of a complementary component of the extension; and Figure 8 is a transverse cross-section on the line 8—8 of Figure 1.

With continued reference to the drawing, the numeral 10 generally indicates the foot-operated clutch-release pedal, and the numeral 11 generally indicates the brake-applying foot pedal of a conventional vehicle. The two pedals 10 and 11 are of conventional construction, and include respective shanks 12 and 13 which extend upwardly through respective apertures 14 and 15 provided in the vehicle floor boards. As illustrated in Figure 8, each shank is provided at its upper end with an apertured, internally screw-threaded boss 16 to which the foot pad 17 is attached. The foot pad comprises a thin plate 18 of circular, or other desired shape, having a covering 19 of resilient material, such as rubber, and a screw-threaded shank 20 projecting outwardly from the center thereof at the side opposite the rubber covering 19 and threaded into the boss 16 of the pedal shank. As the foot pads are subject to rather rapid wear, this arrangement permits the easy and convenient replacement of the pads, when necessary.

The pedal extension of the present invention comprises two angle brackets, as generally indicated at 21 and 22, which are preferably secured to the brake pedal shank and extend across the space between the brake pedal and the clutch pedal to a location adjacent the clutch pedal and are relatively adjustable to compensate for various operating conditions of the two pedals.

The angle bracket 22 has two flat legs 23 and 24 perpendicularly-disposed respective to each other, and provided with respective longitudinally-extending medial slots 25 and 26. The leg 24 is materially longer than the leg 23, and the slot 26 in the leg 24 is correspondingly longer than the slot 25 in the leg 23.

In applying the extension to the brake pedal 11 the foot pad 17 is first removed by threading the shank 20 out of the boss 16, and the leg 24 of the angle bracket 22 is then placed on top of the boss 16 with the slot 26 in alignment with the aperture in the boss, and the foot pad shank 20 inserted through the slot 26 and threaded down in the aperture in the boss 16 to secure the bracket 22 to the brake pedal.

The bracket 21 has two legs 27 and 28 of substantially the same length, and the leg 28 is provided with a longitudinally-extending, medially-disposed slot 29, the leg 27 having no slot or other opening therethrough.

With the bracket 22 attached to the brake pedal, the bracket 21 is positioned so that its leg 28 is against the outer face of the leg 23 of the bracket 22, and a bolt 30 is then inserted through the registering slots 25 and 29, and a nut 31 threaded down on the bolt. The two brackets constituting the assembled extension are then brought to a position, as illustrated in Figure 1, such that the outer end of the leg 27 of bracket 21 is positioned close to the adjacent side of the foot pad of the clutch pedal 10, and the foot pad 17 of the brake pedal 11 is then threaded down to hold the extension in this position. The two pedals are then depressed until the clutch is disengaged, and the brakes are firmly set, and with the pedals held in this position the bracket 21 is moved until the upper surface of its leg 27 is flush with the upper surface of the foot pad of the clutch pedal 10, whereupon the nut 31 is tightened down on the bolt 30 to hold the two components of the extension in this properly adjusted condition.

With the extension thus adjusted, upon depression of the clutch pedal and with the foot resting on the clutch pedal, also overlying the adjacent end of the extension, the brake pedal will also be depressed to apply the brakes at the same time the clutch is released. This is not only a convenient operating condition for stopping the vehicle, but is particularly convenient for holding the vehicle on a hill with the clutch disengaged, since the right foot of the driver may be kept on the accelerator pedal connected to the vehicle engine, and the vehicle will be held from drifting back down a hill by the application of the brakes through the pedal extension. As the clutch is re-engaged, the brake will be released and the engine power can be simultaneously increased at the same time, to continue movement of the vehicle up the hill.

In Figure 1 the dotted line circle 32 indicates the position of the vehicle steering column, and it will be noted that the extension, when in operative position, as illustrated in Figure 1, clears this steering column by a wide space, and it will also be noted that since the bracket 22 of the extension is applied to the top of the brake pedal shank, the extension does not strike the floor boards before the pedals are fully depressed, nor interfere, in any way, with any part of the vehicle or with the operation of the brake and clutch pedals.

In the various positions of adjustment illustrated in Figures 3, 4 and 5, Figure 3 illustrates the condition corresponding to relatively small depression of both pedals necessary to release the clutch and apply the brakes. Under these conditions, the leg 27 of the bracket 21 is brought to a position at which its upper surface is substantially flush with the upper surface of the foot pad of the clutch pedal when both of the pedals are fully released. When this adjustment, as the clutch pedal is depressed, the brake pedal will be depressed substantially the same amount.

The adjustment shown in Figure 4 is for a condition in which the brakes have been considerably worn, but only a small movement of the clutch pedal is required to release the clutch. In this adjustment the bracket 22 is inverted from its position illustrated in Figure 3, so that the leg 23 extends upwardly away from the floor board, instead of downwardly toward the floor board, as illustrated in Figure 3. The bracket 21 is mounted in the same relative position as that illustrated in Figure 3, so that the upper surface of its leg 27 is positioned considerably above the upper surface of the foot pad of the clutch pedal 10 when both of the pedals are fully released. With this adjustment, when the driver desires to depress both of the pedals simultaneously, his foot first engages the angle bracket 21 and depresses the brake pedal until the top surface of the leg 27 of the angle bracket 21 is brought to a position at which it is substantially flush with the top surface of the foot pad of the clutch pedal 10. This takes up the lost motion in the brake pedal and brings the brake pedal to a position at which it will engage the brakes when the clutch pedal is moved an amount sufficient to disengage the clutch, as indicated by the dotted line c in Figure 4, the brake-engaging position of the brake pedal in this figure being indicated by the line d. The clutch-disengaging and brake-engaging positions of the two pedals in Figure 3 are indicated by the dotted lines a and b.

Figure 5 shows the adjustment for a condition such as might exist when the clutch is worn, but the brakes have been recently relined or adjusted, so that a large movement of the clutch pedal is required to release the clutch, but only a small amount of movement of the brake pedal is required to engage the brakes. For this adjustment, the bracket 22 is mounted in the same position as that illustrated in Figure 3 with its leg 23 directed downwardly toward the floor boards. The position of the bracket 21, however, is reversed, so that the leg 27 of this bracket is positioned below the leg 24 of the bracket 22. Under these conditions, the driver will first depress the clutch pedal 10 to take up lost motion in this pedal, and will not contact the leg 27 of the extension bracket 21 until the clutch pedal has been brought to a position at which its further depression necessary to release the clutch is substantially the same as the amount of depression of the brake pedal necessary to engage the brakes. In all three adjustments, when the clutch is released, and the brakes engaged, the upper surface of the leg 27 of bracket 22 will be substantially flush with the top surface of the foot pad of the clutch pedal 10, so that both pedals function simultaneously under operation by one foot of the driver of the vehicle, the driver's other foot being free to control the throttle of the vehicle engine. In Figure 5, the clutch-releasing location of the clutch pedal, and the brake-engaging position of the brake pedal are indicated by the dotted lines e and f.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An extension for an automotive vehicle foot pedal of the type having a pad portion secured to the top of the pedal by a stud, comprising a first angle bracket having perpendicularly disposed legs, one of said legs having a longitudinal slot therein, said one leg being adapted to be adjustably secured to the top end of the pedal underlying the pad portion of the pedal by the stud passing through said slot, with the other leg adapted to be disposed either in an upwardly extending position or in a downwardly extending position, said other leg being formed with a longitudinally extending slot, a second angle bracket having perpendicularly disposed legs, one of the legs of said second bracket being formed with a longitudinal slot, and a bolt extending through the slotted leg of said second bracket and said other leg of the first bracket adjustably securing the slotted leg of said second bracket in face to face relation with said other leg of said first bracket, whereby the remaining leg of the second bracket may be positioned in any one of a wide range of laterally extending positions from a position spaced a substantial distance below the plane of the foot pedal pad portion to a position spaced a substantial distance above the plane of said foot pedal pad portion.

2. An extension for an automotive vehicle foot pedal of the type having a pad portion secured to the top of the pedal by a stud, comprising a first angle bracket having perpendicularly disposed legs of unequal length, the longer of said legs having a longitudinal slot therein, said longer leg being adapted to be adjustably secured to the top end of the pedal underlying the pad portion of the pedal by the stud passing through said slot, with the shorter leg adapted to be disposed either in an upwardly extending position or in a downwardly extending position, said shorter leg being formed with a longitudinally extending slot, a second angle bracket having perpendicularly disposed legs of substantially equal length, one of the legs of said second bracket being formed with a longitudinal slot, and a bolt extending through the slotted leg of said second bracket and said shorter leg of the first bracket adjustably securing the slotted leg of said second bracket in face to face relation with said shorter leg of said first bracket, whereby the remaining leg of the second bracket may be positioned in any one of a wide range of laterally extending positions from a position spaced a substantial distance below the plane of the foot pedal pad portion to a position spaced a substantial distance above the plane of said foot pedal pad portion.

OTTO S. OLSEN.

REFERENCES CITED

The following references are of record in the file of this patent:

UNITED STATES PATENTS

| Number | Name | Date |
| --- | --- | --- |
| 210,669 | Coates | Dec. 10, 1878 |
| 2,078,324 | Griffiths | Apr. 27, 1937 |
| 2,451,700 | Van Trine | Oct. 19, 1948 |